United States Patent
Tolbert et al.

(10) Patent No.: US 10,147,936 B2
(45) Date of Patent: Dec. 4, 2018

(54) NANOPOROUS TIN POWDER FOR ENERGY APPLICATIONS

(71) Applicant: THE REGENTS OF THE UNIVERSITY OF CALIFORNIA, Oakland, CA (US)

(72) Inventors: Sarah Tolbert, Los Angeles, CA (US); Eric Detsi, Los Angeles, CA (US); John Cook, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 158 days.

(21) Appl. No.: 15/295,884

(22) Filed: Oct. 17, 2016

(65) Prior Publication Data

US 2017/0110717 A1    Apr. 20, 2017

Related U.S. Application Data

(60) Provisional application No. 62/242,241, filed on Oct. 15, 2015.

(51) Int. Cl.
| | |
|---|---|
| H01M 4/13 | (2010.01) |
| H01M 10/05 | (2010.01) |
| H01M 4/134 | (2010.01) |
| H01M 4/62 | (2006.01) |
| H01M 10/0525 | (2010.01) |
| H01M 4/38 | (2006.01) |
| H01M 4/04 | (2006.01) |
| H01M 4/1395 | (2010.01) |
| H01M 4/02 | (2006.01) |

(52) U.S. Cl.
CPC .......... *H01M 4/134* (2013.01); *H01M 4/049* (2013.01); *H01M 4/1395* (2013.01); *H01M 4/387* (2013.01); *H01M 4/622* (2013.01); *H01M 4/625* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 8,758,959 B2 * | 6/2014 | Mei | C23C 14/205 429/527 |
| 9,368,801 B2 * | 6/2016 | Moon | H01M 4/8657 |
| 2011/0120874 A1 * | 5/2011 | Wu | C22C 1/0483 205/50 |

(Continued)

FOREIGN PATENT DOCUMENTS

| | | | |
|---|---|---|---|
| GB | 201014706 | * 10/2010 | B22F 9/04 |

*Primary Examiner* — Scott J. Chmielecki
(74) *Attorney, Agent, or Firm* — O'Banion & Ritchey LLP; John P. O'Banion

(57) ABSTRACT

A nanoporous tin is disclose, along with a method of fabrication thereof, the tin having a hierarchical nanoporous and mesoporous ligament morphology that exhibits long-term cyclability, particularly when used as anode material in Li-ion. One embodiment of the present technology is a fabrication method to directly produce nanoporous tin in powder form, rather than a monolithic piece of nanoporous metal, so that the NP-Sn powder can be directly integrated into composite electrodes using commercial battery electrode processing techniques.

17 Claims, 14 Drawing Sheets

FIG. 1B

(56) References Cited

U.S. PATENT DOCUMENTS

| | | | |
|---|---|---|---|
| 2011/0294012 A1* | 12/2011 | Nakabayashi | H01M 4/134 |
| | | | 429/218.1 |
| 2013/0344394 A1* | 12/2013 | Yang | H01M 4/366 |
| | | | 429/231.8 |
| 2014/0272578 A1* | 9/2014 | Xiao | C01B 33/021 |
| | | | 429/218.1 |
| 2014/0335441 A1* | 11/2014 | Tsukamoto | C25D 5/50 |
| | | | 429/522 |
| 2015/0064564 A1* | 3/2015 | Lim | H01M 4/366 |
| | | | 429/231.8 |
| 2016/0049656 A1* | 2/2016 | Laicer | H01M 4/366 |
| | | | 429/213 |
| 2017/0117557 A1* | 4/2017 | Okuno | H01M 8/0232 |
| 2017/0200939 A1* | 7/2017 | Murphy | C22C 21/02 |

* cited by examiner

NANOPOROUS TIN POWDER FOR ENERGY APPLICATIONS

CROSS-REFERENCE TO RELATED APPLICATIONS

This application claims priority to, and the benefit of, U.S. provisional patent application Ser. No. 62/242,241 filed on Oct. 15, 2015, incorporated herein by reference in its entirety.

STATEMENT REGARDING FEDERALLY SPONSORED RESEARCH OR DEVELOPMENT

This invention was made with Government support under DE-SC0001342, awarded by the U.S. Department of Energy. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This description pertains generally to energy storage, and more particularly to materials for use in energy storage devices.

2. Background Discussion

Commercialization of the first Li-ion batteries in 1991 was made possible by the so-called rocking technology, which utilized $LiCoO_2$ and graphite electrodes. Twenty-four years later, graphite is still used as a negative electrode in the majority of Li-ion batteries. The success of graphitic carbon electrodes is attributed to its high electronic conductivity, low volume change during cycling and long cycle lifetime. However, its low coulombic efficiency, and relatively low gravimetric theoretical capacity limits the usage of graphite in Li-ion batteries for long range electric vehicles and miniaturized portable electronics devices. These new advanced applications require materials with higher energy storage densities than graphite can provide. Among alternative anode materials, tin is an attractive candidate for its high theoretical gravimetric Li storage capacity of 990 $mAhg^{-1}$. In addition, Sn has high metallic electrical conductivity, which can lead to highly conductive composite electrodes. Unfortunately, as with many high-capacity anode materials, the alloying reaction of Sn with Li is associated with extreme volume changes (~300%) between the initial and final states. This expansion is thought to be responsible for the electrode failure of bulk micrometer tin particles after just a few cycles. One significant failure mechanism is crack propagation and pulverization of the active electrode material leading to electronically isolated fragments that no longer contribute to the total capacity of the electrode.

The abovementioned cell failure and corresponding short battery lifetimes represent the main challenge in this field and has significantly delayed the development of high-performance Sn anodes for Li-ion batteries. Developing a high capacity nanostructured Sn anode with good cycle life still remains a major challenge. In fact, even small Sn nanocrystals have been shown to suffer from deleterious effects of extreme volume changes during cycling.

Previous studies have found that nanoporous tin (NP-Sn) having a nanowire-like ligament morphology does not exhibit long-term cyclability when used as anode material in Li-ion.

BRIEF SUMMARY

One aspect of the present description is a nanoporous tin (NP-Sn), and method of fabrication thereof, having a porous ligament morphology that exhibits long-term cyclability, particularly when used as anode material in Li-ion. One embodiment of the present technology is a fabrication method to directly produce nanoporous tin in powder form, rather than a monolithic piece of nanoporous metal, so that the NP-Sn powder can be directly integrated into composite electrodes using commercial battery electrode processing techniques. Furthermore, the processing procedure for fabrication of the NP-Sn powder into composite electrodes for a commercial battery electrode is preferably low-cost and easily applicable for large-scale synthesis.

One aspect of the present description is fabrication of micrometer sized grains of porous Sn (i.e. NP-Sn in the powder form) by use of parent alloys with high sacrificial element content (>80 at. % Mg) to promote the full fragmentation of NP-Sn during dealloying, In one embodiment, the high content of sacrificial Mg and the high amount of $H_2$ and $NH_3$ gas released during the selective corrosion of Mg according to the methods of the present description promote the pulverization of dealloyed NP-Sn, resulting in a micrometer sized NP-Sn powder after dealloying.

Another aspect of the present description is a novel NP-Sn powder with nanoparticle ligaments made by selective dealloying. The fabrication method of the present description uses a Sn—Mg binary system with composition $Sn_{15}Mg_{85}$ at. % as precursor to NP-Sn. It has been demonstrated through use of synchrotron based transmission X-ray microscopy (TXM) that the NP-Sn structure of the present technology is ideal for accommodating the large volume expansion associated with energy storage in this material, with attractive energy storage properties, namely: high capacity, increased cycle lifetimes, and good kinetic performance.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 17A:
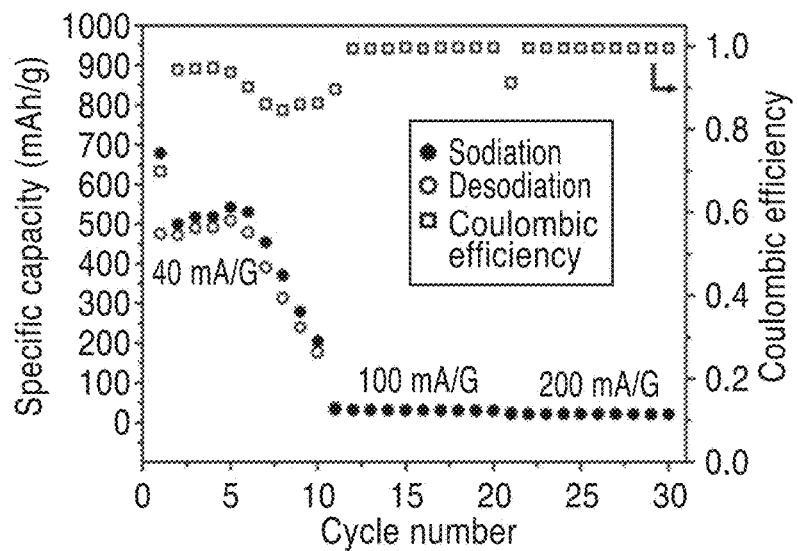
Figure 17B:
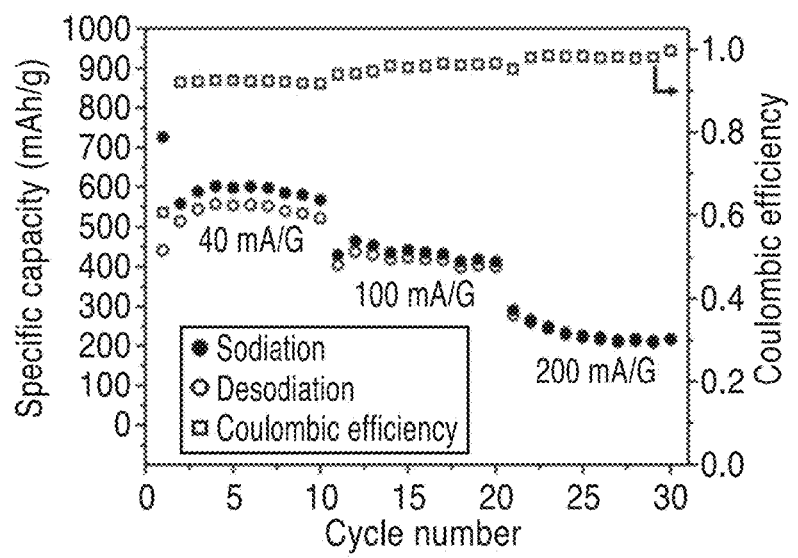
Figure 18:
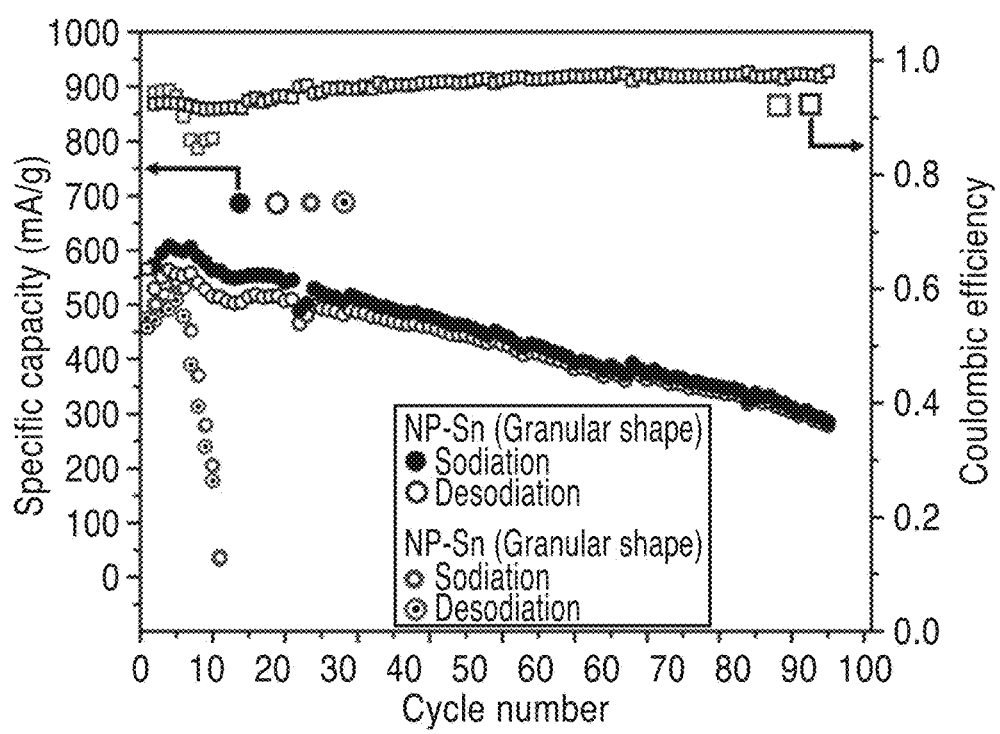

FIG. 17A and FIG. 17B show corresponding capacities and coulomb efficiency as a function of the number of cycles at different current densities for sodiation (solid dots) and desodiation (circles) of nanowire-shaped NP-Sn (FIG. 17A) and the granular-shaped NP-Sn (FIG. 17B) of the present description FIG. 18 shows a plot of the long-term stability test for nanowire-shaped NP-Sn (light curve) and granular-shaped NP-Sn (dark curve) for sodiation (solid dots) and desodiation (circles) performed at a current density of 40 mA/g.

DETAILED DESCRIPTION

The description herein details the synthesis of 1-100 µm tin particles having a hierarchical nanoporous architecture, and its use in energy applications. The nanoporous tin of the present description is synthesized through a free-corrosion dealloying method that is both economical and scalable. Furthermore, the particle size and the porosity can be tuned to match specific application requirements (e.g. high energy density or high power density battery applications).

The nanoporous tin of the present description may be used as a high energy density Na-ion electrode, Li-ion electrode, or the like. These composite electrodes are highly porous to allow reversible expansion concomitant with cycling. The combined porosity of the micrometer porous tin particles fabricated in a conductive/flexible carbon mesh leads result in long cycle life and fast kinetic performance.

While the present description is directed at nanoporous tin, the synthetic aspects of the material architecture and processing methods therefore may be extended to other porous materials synthesized using similar methods. This includes nanoporous Ge, Sb, As, Bi, Si, Pb, Al, etc. Nanoporous Sn-based binary and ternary alloys can also be considered including nanoporous SnC, SnSb, SnSi, SnAs, SnGe, SnMg, SnAl, SnBi, SnCo, SnNi, and other materials.

The systems and methods of the present description address the need for high energy dense negative electrode materials for Li-ion, Na-ion, and Mg-ion batteries. Micrometer dense tin generally cannot be used as an electrode material because of significant failure after a few cycles. The material described in the present description, however, can undergo many charge and discharge cycles with Li-ions and Na-ions (and presumably with Mg-ions) while maintaining a high energy density. The long material lifetimes and fast kinetics are attributed to the unique nanoscale architecture, porosity, high surface area, and good electrical conductivity.

Besides electrochemical energy storage, the materials of the present description may also be exploited as a high-surface area catalyst. For example, a particularly promising application is the use of Sn electrodes for electrocatalytic reduction of $CO_2$ to CO, where we expect improved performance with nanoporous Sn as electrodes.

By way of example, and not of limitation, a NP-Sn powder was fabricated with nanoscale ligaments (~100 nm) that are comprised of 2-3 nm nanoparticles. While the powder was made by selective dealloying, it is appreciated that other fabrication techniques may also be employed. A Sn—Mg binary system was used with composition $Sn_{15}Mg_{85}$ at. % as precursor to NP-Sn.

1. Nanoporous Architecture

Figure 1A:
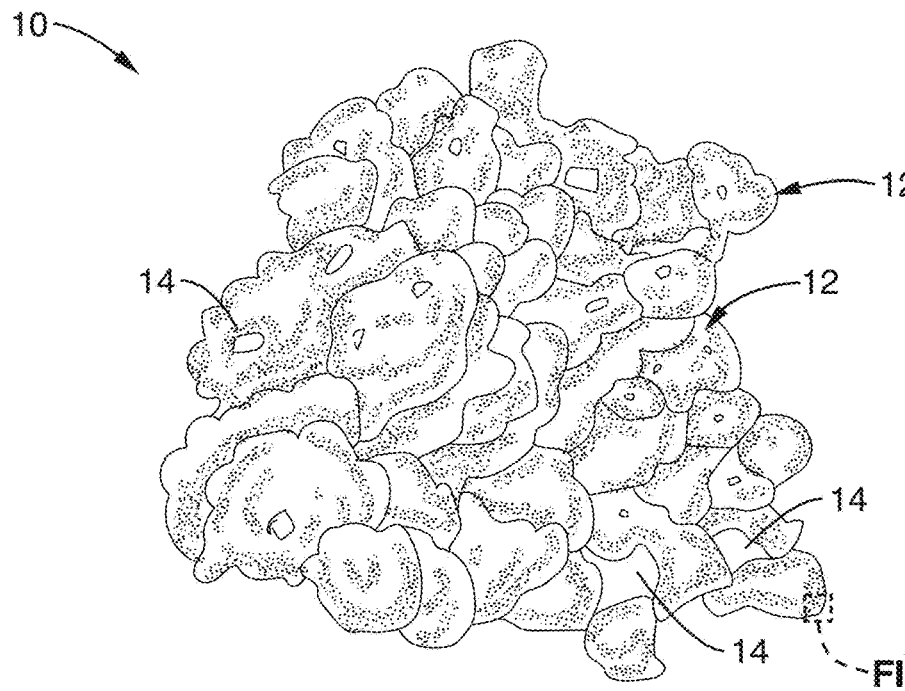
FIG. 1A and FIG. 1B show a schematic views of the nanoporous architecture of nanoporous tin powder fabricated in accordance with the present invention.
Figure 1B:
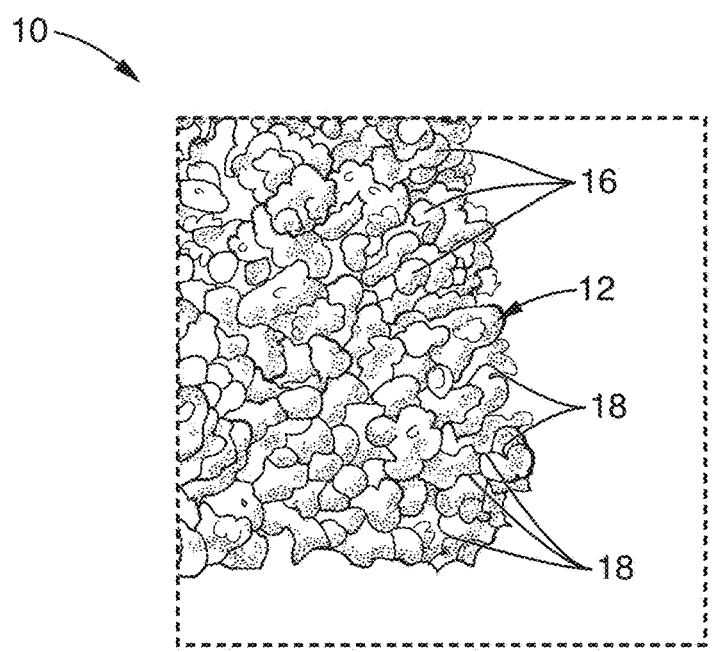

FIG. 1A and FIG. 1B show a schematic views of the nanoporous architecture of nanoporous tin powder 10 fabricated in accordance with the present invention. As seen in FIG. 1A, the nanoporous tin powder 10 comprises a network of ligament-shaped structures 12 defining a series of pores 14. FIG. 1B shows an enlarged detailed view of one of the ligaments 12 of FIG. 1A. FIG. 1B shows that each ligament 12 is not a smooth, contiguous structure, but rather hierarchically interconnected nanocrystals 16 forming a granular structure having sub-pores 18. Detailed SEM and TEM of the images of this structure are detailed in FIG. 3A through 3C and FIG. 4A through FIG. 4C, respectively.

In one embodiment the pores are defined as the cavities disposed between adjacent ligament structures 12, and generally comprise nanopores 14 (e.g. approximately 100 nm in size). The average ligament 12 diameter is between 100 nm and 200 nm. Furthermore, the nanocrystals 16 and sub-pores are meso-scale structures (e.g. mesopores approximately 5 nm in size).

2. Synthesis of Nanoporous Sn Powder

Figure 2:
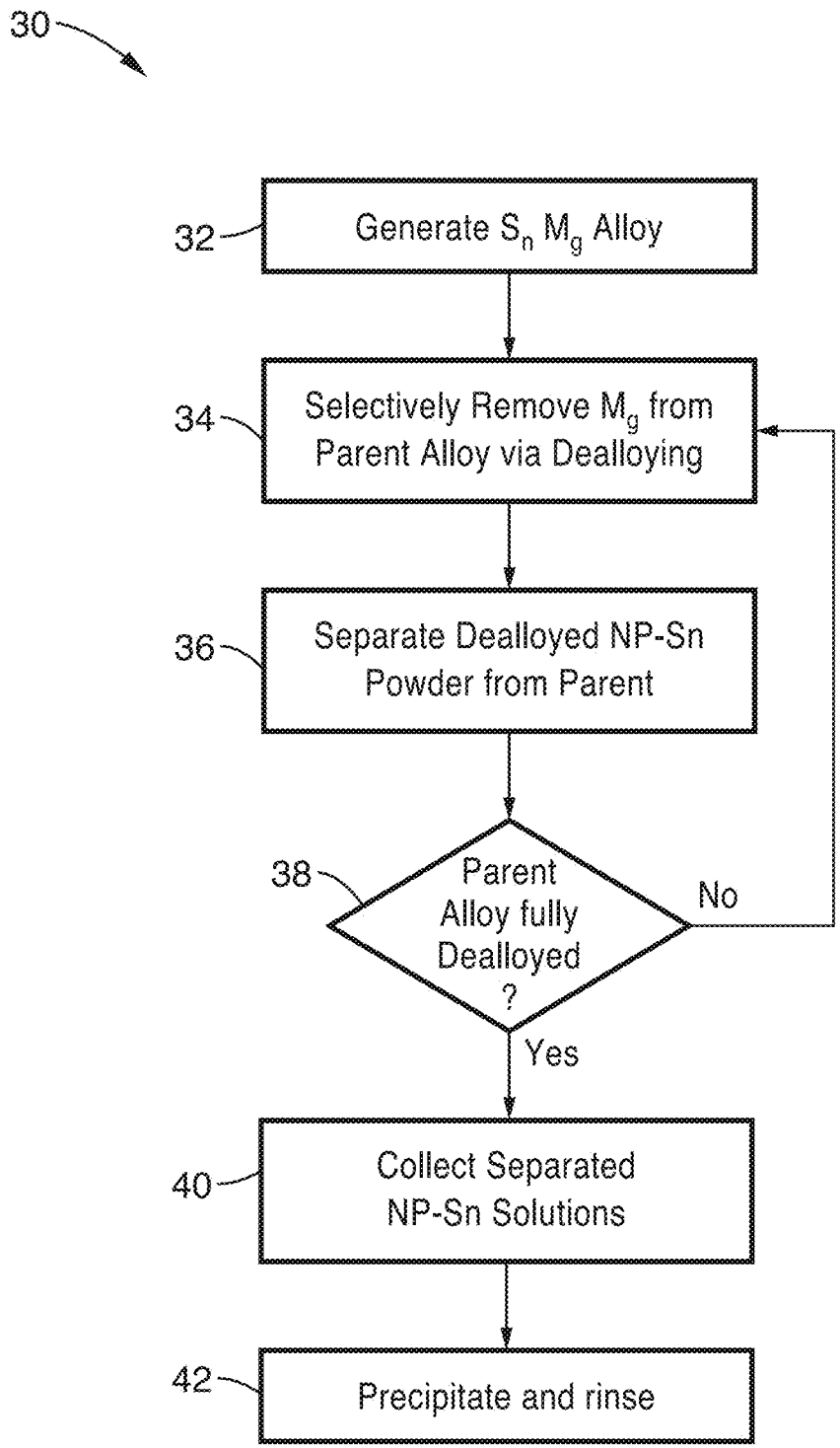
FIG. 2 shows a process flow diagram for an exemplary method of fabricating porous tin powder in accordance with the present description.

FIG. 2 shows a process flow diagram for an exemplary method 10 of fabricating porous tin powder in accordance with the present description.

First, the master alloy (e.g. $Sn_{15}Mg_{85}$ at. %) was made at step 32 by melting Sn (1N, Alfa Asear) and Mg (1N, Alfa Asear) at 750° C. in a graphite crucible, using a quartz tube under argon flow. The Mg content in the master alloy was initially taken to be about 10% higher than the desired content in order to compensate for Mg evaporation during melting. The metallic melt was homogeneously mixed by repeated mechanical shaking of the graphite boat. The amount of Mg evaporated during the melting process was tracked from the loss of weight of the master alloy. The alloying process was stopped when the desired weight loss of the master alloy, as a result of Mg evaporation, was achieved (i.e. evaporation of the excess ~10% Mg). The synthesized alloy is brittle and displays a purple color. In a typical synthesis procedure, the final weight of our $Sn_{15}Mg_{85}$ at. % parent alloy was ~2.5 g and the corresponding amount of NP-Sn generated during dealloying was ~1.1 g. We emphasize with respect to up scaling that the amount of parent alloy (2.5 g) was only restricted by the size of the graphite crucible, i.e. our procedure is easily scalable for the synthesis of a large amount of NP-Sn.

Next, at step 34, Mg is selectively removed from the parent alloy (~2.5 g of $Sn_{15}Mg_{85}$ at. %) by free-corrosion dealloying in 300 mL of 1 M ammonium sulphate used as corroding solution.

The high content of sacrificial Mg and the high amount of $H_2$ and $NH_3$ gas released during the selective corrosion of Mg according to Eq. 1, promote the pulverization of dealloyed NP-Sn, resulting in a micrometer sized NP-Sn powder after dealloying:

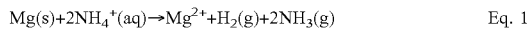

$$Mg(s)+2NH_4^+(aq)\rightarrow Mg^{2+}+H_2(g)+2NH_3(g) \quad \text{Eq. 1}$$

Rather than the formation of monolithic NP-Sn, as in the case of dealloying with an acetic acid solution, free-corrosion dealloying in ammonium sulfate solution results in full pulverization of dealloyed NP-Sn into micrometer sized pieces. The dealloying reaction is facile, as indicated by calculated changes in enthalpy, entropy and free energy for the reaction in Eq.1, above. Values are: $\Delta S=-44.41$ J/mol·K and $\Delta G=-349.18$ kJ/mol. The reaction is enthalpically down-hill, domination by the enthalpy of oxidizing Mg to $Mg^{2+}$. Any release of the ammonia gas can be neglected because the solubility of ammonia in water is very high (around 16M, 33% w/w, or 2.64 mol/100 g of water). Overall, the reaction is highly favorable, with the large negative free energy change being dominated by the enthalpy of Mg oxidation.

During dealloying, the initially non-colored ammonium sulphate solution turns dark grey or black within a few minutes as a consequence of the pulverization of the parent alloy. The final color of the solution (dark grey or black) depends on the size of the NP-Sn powder grains, as it comprises of micrometer sized grains of NP-Sn.

At step 36, the solution of micrometer sized grains of NP-Sn (i.e. dispersed NP-Sn powder) was separated from the unreacted Sn/Mg parent alloy and decanted or transferred into a second container and diluted with more water (from 300 mL to at least 600 mL) in order to neutralize the corroding solution and limit the coarsening of the freshly dealloyed NP-Sn powder.

At this stage, the initial piece of parent alloy in the main container may not yet be fully dealloyed. Therefore, a fresh solution of 300 mL of 1M ammonium sulphate was added to that initial piece of parent alloy for further dealloying (i.e. step 34 is repeated). Again, after a few minutes, the fresh ammonium sulphate corroding solution turns dark grey (or black) as a consequence of the pulverization of the parent alloy during selective corrosion. The second solution of micrometer sized grains of NP-Sn is then separated (i.e. repeat step 36) and transferred into a third container. The above procedure is repeated until the initial piece of Sn/Mg parent alloy is found at step 38 to be fully pulverized and fully dealloyed.

At step 40, the different separated solutions (containing the NP-Sn particles) from step 36 were all diluted with water and kept for a few hours in order to allow the NP-Sn particles to precipitate (centrifugation is not recommended because the micrometer sized grain of NP-Sn may cluster together). After precipitation, the water was removed and new water was added in order to rinse the NP-Sn particles. The precipitation and rinse process 42 may be repeated a few times until the appropriate pH was reached (e.g. PH of 7). In one exemplary experiment, once the rinsing process is successfully carried out, energy dispersive X-ray spectroscopy (EDS) analysis of the NP-Sn particles did not show any trace of sulfur (S) from ammonium sulfate.

3. NP-Sn Micro-structural Characterizations

Powder X-ray diffraction (XRD) was performed in a PANalytical X'Pert Pro operating with Cu Kα ($\lambda=1.5418$ Å) using a 0.03° step size, a voltage of 45 kV, and a current of 40 mA. XRD patterns were recorded in the range of $10°<2\theta<80°$. Transmission electron microscopy (TEM) was performed using a FEI Technai T12 operating at 120 kV. Nitrogen porosimetry was carried out using a Micromeritics TriStar II 3020. The surface area was calculated from the adsorption branch of the isotherm between (0.04-0.30 P/Po) using the Brunauer-Emmett-Teller (BET) model. The pore diameter and pore volume was also calculated from the adsorption branch of the isotherm using the Barret-Joyner-Halenda (BJH) model. X-ray photoelectron spectroscopy (XPS) analysis was performed using a Kratos Axis Ultra DLD with a monochromatic Al (Kα) radiation source. The charge neutralizer filament was used to control charging of the sample, 20 eV pass energy was used with a 0.1 eV step size, and scans were calibrated using the C 1 s peak shifted to 284.6 eV. The integrated area of the peaks was found using the CasaXPS software, and atomic ratios were also found using this software. The atomic sensitivity factors used were from the Kratos library within the Casa software.

Transmission X-ray Microscopy was performed at beamline 6-2C of the Stanford Synchrotron Radiation Lightsource (SSRL) at the SLAC National Accelerator Laboratory. X-rays at 7 keV were used to perform non-destructive investigation of the electrode morphology at nano/meso scale. The electrode samples were peeled off the metal current collector to avoid unnecessary absorption of the X-rays by the copper foil. The samples were kept in steady Helium flow during the measurement to avoid oxidation by the air and to mitigate heat load from the focused X-ray illumination. Projection images were collected over an angular range of 180 degrees with step size of 1 degree. 3D volumes at about 16×20×30 μm³ were reconstructed with voxel size at 27.3×27.3×27.3 nm³ using in-house developed software package known as TXM-Wizard.

Figure 3A:
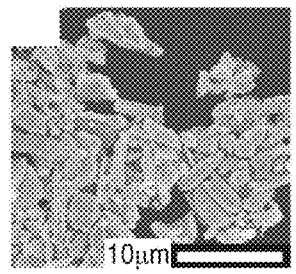
FIG. 3A through FIG. 3C show scanning electron microscopy (SEM) images of the fabricated NP-Sn of the present description at different magnifications (10 µm, 1 µm, and 100 nm, respectively).
Figure 3B:
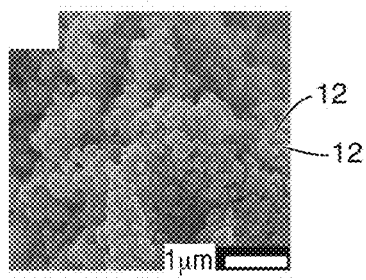
Figure 4B:
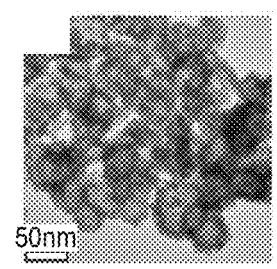
Figure 3C:
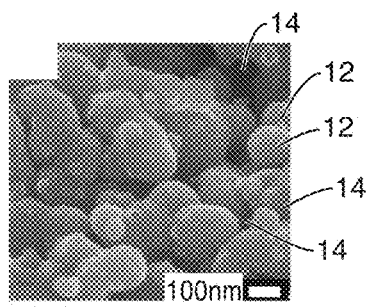

FIG. 3A through FIG. 3C show scanning electron microscopy (SEM) images of the fabricated NP-Sn at different magnifications (10 μm, 1 μm, and 100 nm, respectively). The low magnification image of FIG. 2A shows the as-synthesized NP-Sn powder comprises randomly shaped NP-Sn grains with varying sizes in the sub-10 μm range. The higher magnification image of FIG. 3B and FIG. 3C show the porous nanostructure, which comprises 100-300 nm ligaments and pores.

While the porous architecture in the NP-Sn is disordered, a common feature in most nanoporous metals, the ligaments are shown in FIG. 3C to be an aggregation of nanoparticles rather than interpenetrating nanowire type morphology, as it is the case in common dealloyed nanoporous metals (see FIG. 5A through FIG. 5C, described in further detail below). The average ligament diameter varies between ~100 and ~200 nm.

Figure 4A:
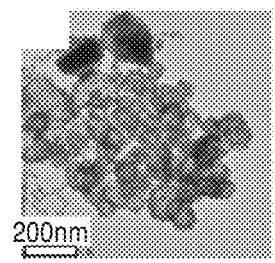
FIG. 4A through FIG. 4C show transmission electron microscopy (TEM) images of the fabricated NP-Sn at different magnifications (200 nm, 50 nm, and 20 nm, respectively).
Figure 4C:
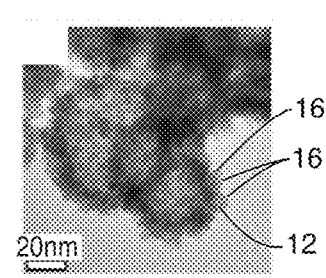

The nanoparticle ligament morphology was further characterized by transmission electron microscopy (TEM), as shown in FIG. 4A though FIG. 4C. It can clearly be seen from these TEM micrographs that the individual ligaments further formed of randomly clustered 5 nm Sn nanocrystals. The images in FIG. 3A though FIG. 4C illustrate that the ligaments forming the primary building-block of this hierarchical structure are themselves porous, and are constructed from small nanoparticles. The 3D interconnections of these ligaments form the secondary pore (i.e. sub-pore) structure of the NP-Sn architecture, resulting in a hierarchical porous architecture.

Figure 5A:
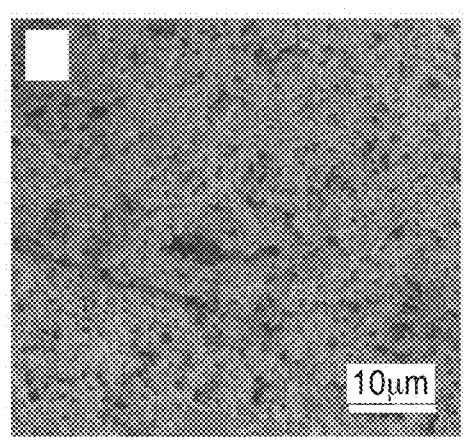
FIG. 5A through FIG. 5C show scanning electron microscopy (SEM) images of the prior art NP-Sn of a monolithic piece of tin having nanowire-like ligaments, at different magnifications (10 µm, 500 nm, and 200 nm, respectively).
Figure 5B:
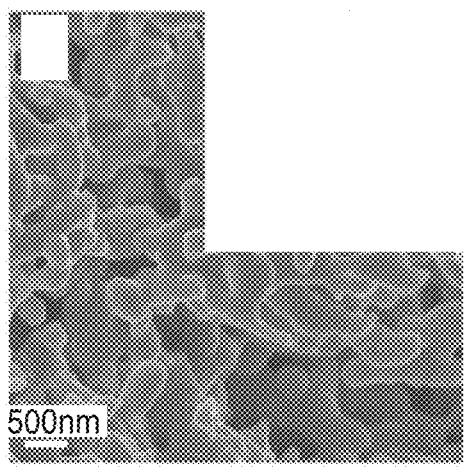
Figure 5C:
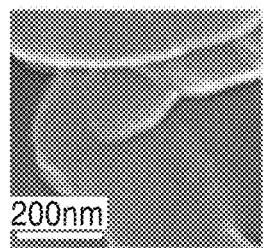

FIG. 5A through FIG. 5C show SEM images of a fracture cross-section of prior art NP-Sn (dealloyed in acetic acid solution) at different magnifications (10 μm, 500 nm, and 200 nm, respectively). As shown in FIG. 5A, the samples are monolithic, meaning they are not fragmented into pieces. The average ligament size is ~300, nm and those ligaments form a network of randomly interconnected nanowires having a generally smooth, contiguous structure, —hence the name "nanowire ligament morphology."

4. Electrode Preparation

Figure 6A:
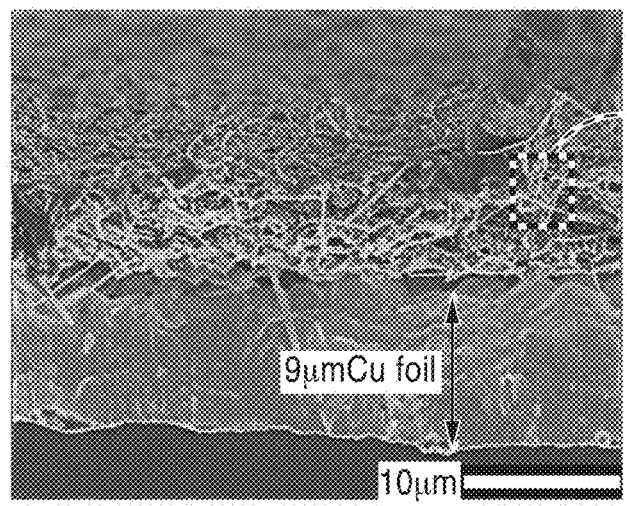
FIG. 6A shows a cross-sectional view of an anode electrode made from a slurry comprising of 66 wt. % NP-Sn powder used as active component for Li storage, 16 wt. % vapor grown carbon fibers used as conductive additive, and 18 wt. % carboxymethyl cellulose used as binder.
Figure 6B:
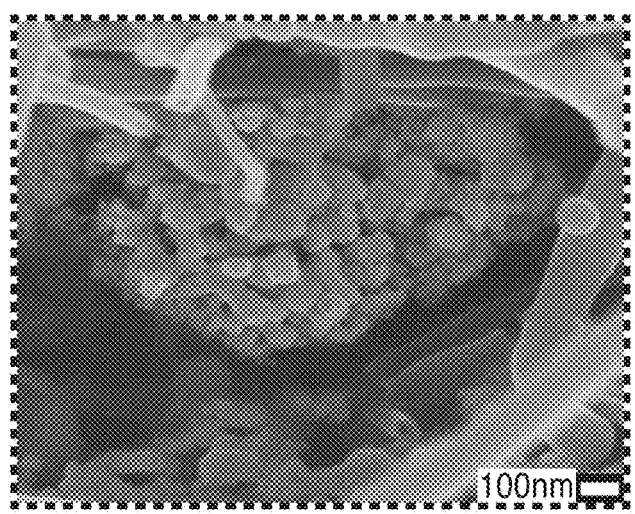
FIG. 6B shows enlarged view of the electrode of FIG. 6B.

Referring to FIGS. 6A and 6B, an anode electrode was made from a slurry comprising of 66 wt. % NP-Sn powder (as detailed above) used as active component for Li storage, 16 wt. % vapor grown carbon fibers (Sigma Aldrich) used as conductive additive, and 18 wt. % carboxymethyl cellulose ($M_w$=250K, Sigma Aldrich) used as binder. The three components were mixed together with water by ball-milling in order to obtain a homogeneous thick paste. The slurry was then casted on 9 μm copper foil to form a ~14 μm thick composite electrode (see FIG. 6A), dried at ambient temperature for 1 h, and further dried at 70° C. under vacuum overnight to evaporate the excess solvent. The mass loading of the electrode was ~1 mg·cm$^{-2}$ of active material. As seen in the high resolution view of the electrode cross-section of FIG. 6B, the slurry layer comprises an interwoven network of carbon fibers that allow for hierarchical support of the NP-Sn upon volume expansion.

The electrodes were assembled into 2016 coin cells using lithium metal as counter electrode, glass fiber (Watman) as separator, and 1 M LiPF$_6$ in a 1:1 ethylene carbonate/dimethylcarbonate solvent (Sigma Aldrich) with 5% (v/v) fluorinated ethylene carbonate (TCI America) as electrolyte. Half-cell cycling was studied between 0.07 and 1.0 V (vs. Li/Li+) using an Arbin BT-2000. Electrochemical impedance spectroscopy was carried out on a VSP potentiostat/galvanostat (Bio-Logic). The impedance measurements were performed on two-electrode coin cells between 900 kHz and 100 mHz under ac potentiostatic stimulus with a 10 mV amplitude under no bias. Impedance data was collected at ca. 1V after each deinsertion cycle. A 60 second rest was applied before each impedance measurement during which time the voltage of the cell dropped from 1000 mV to ~950 mV.

While carbon fibers are shown as the conductive additive in the electrode embodiment above, it is appreciated that other alternative conductive additives may be employed, including, but not limited to: vapor grown carbon fibers (VGCF), graphite, carbon nanotubes, fullerenes, graphene flakes, carbon black, and conductive polymer nanoparticles.

While carboxymethyl cellulose (CMC) is described as the binder in the electrode embodiment above, it is appreciated that other alternative binders may be employed, including, but not limited to: polyacrylic acid or, styrene-butadiene rubber or, polyvinylidene fluoride binder and combinations thereof.

5. Results

Figure 7A:
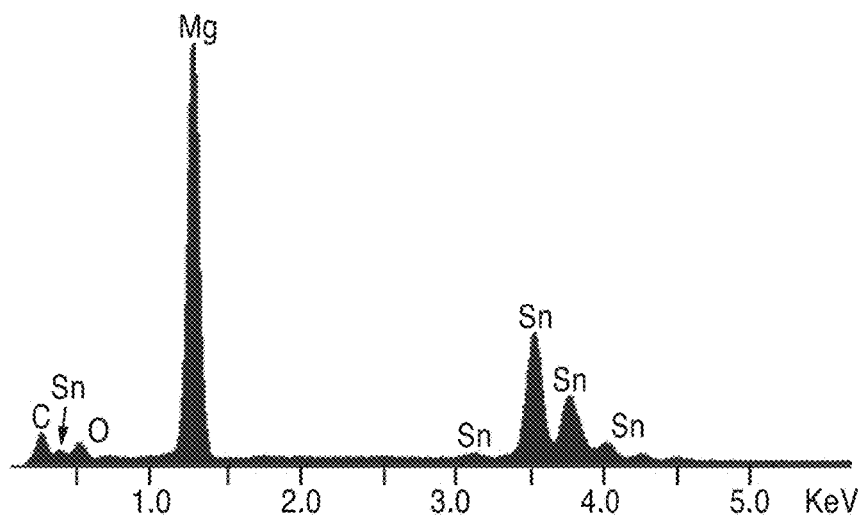
FIG. 7A shows a plot of energy-dispersive X-ray spectroscopy spectrum of Sn15Mg85 parent alloy prior to dealloying.
Figure 7B:
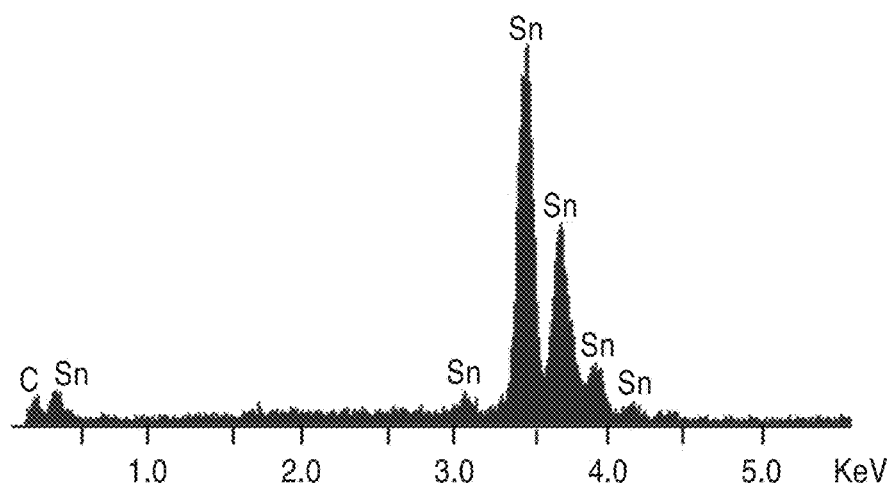
FIG. 7B shows a plot of energy-dispersive X-ray spectroscopy spectrum of NP-Sn after dealloying of the parent alloy of FIG. 7A.
Figure 8:
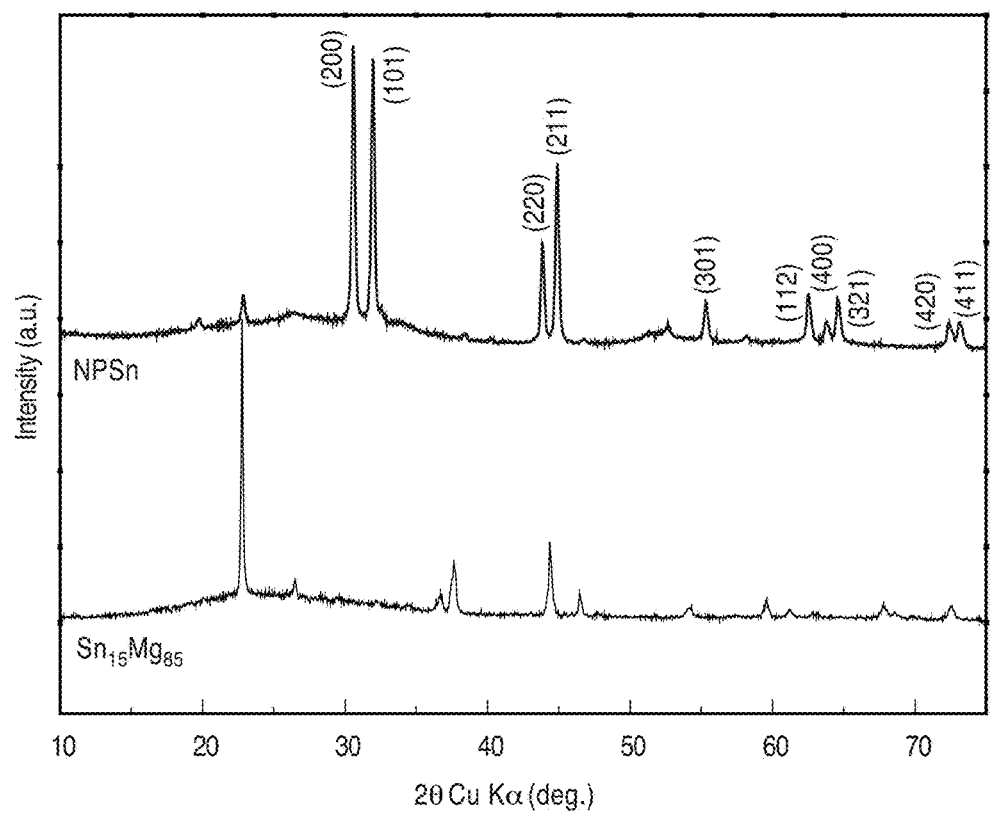
FIG. 8 shows a plot of X-ray diffraction patterns of the parent alloy (before dealloying—in black) and of NP-Sn (after dealloying—grey).

The EDS spectra of the parent alloy before and after dealloying are shown in FIG. 7A and FIG. 7B, respectively. The intense Mg signal observed in FIG. 7A has almost entirely vanished in FIG. 7B as a result of the dealloying process. Quantitative elemental analysis reveals that the residual Mg content in NP-Sn is below 5 at. %. FIG. 8 shows the XRD pattern of the parent alloy before (lower curve) and after (upper curve) dealloying. The dominant phase in the parent alloy corresponds to the Mg$_2$Sn intermetallic compound, and the calculated Scherrer width of this phase is 60 nm. However, this crystalline phase nearly vanishes after dealloying, resulting in NP-Sn that crystallizes in the tetragonal structure of β-Sn (I41/amd space group).

Figure 16A:
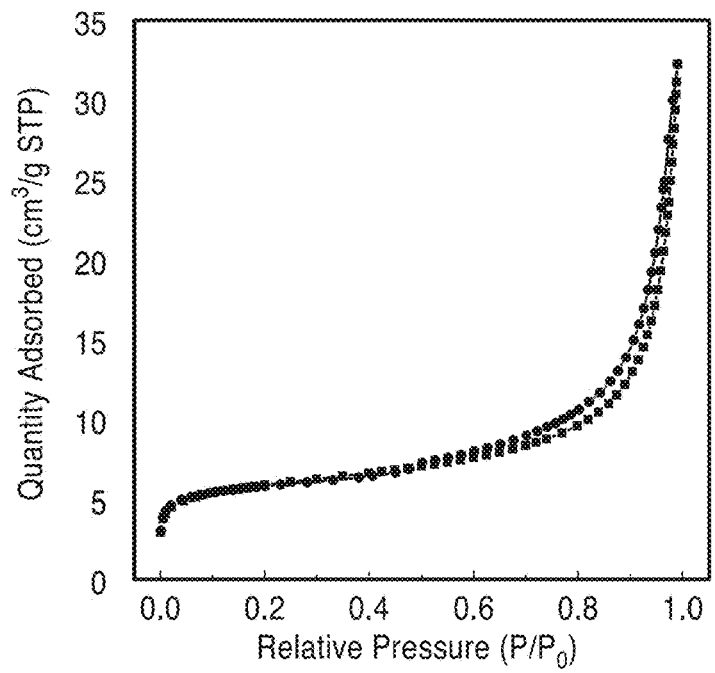
FIG. 16A is a plot of adsorption and desorption nitrogen isotherms.
Figure 16B:
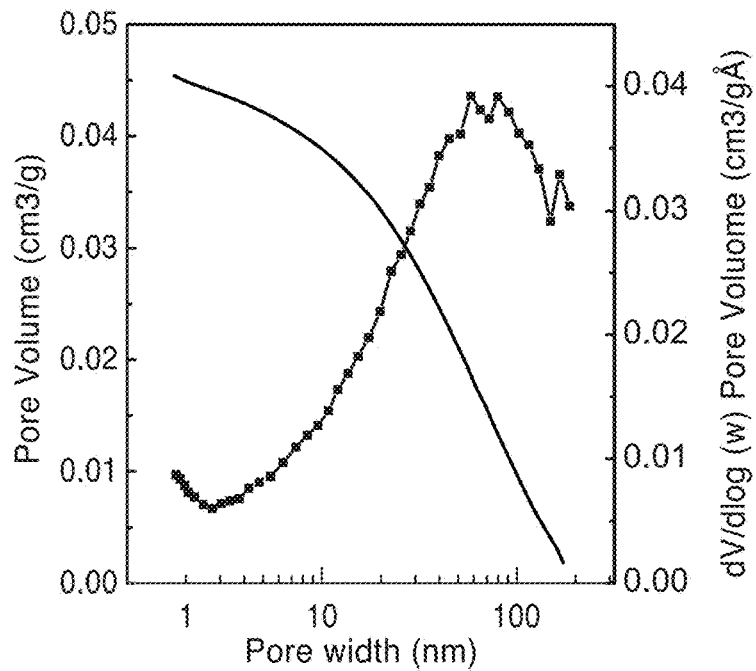
FIG. 16B is a plot of pore size distribution calculated from the Barret Joyner and Halenda model.

Nitrogen adsorption experiments were also performed in order to confirm the presence of porosity in the dealloyed NP-Sn powder. The NP-Sn was shown to exhibit a type II N$_2$ adsorption-desorption isotherm, with hysteresis occurring above 0.6 P/P$^0$ (see FIG. 16A). This type of adsorption behavior is indicative of a material with both mesopores and macropores. The BET specific surface area is calculated to be equal to 19 m$^2$g$^{-1}$. Surface area is an extremely important metric for alloy type anode materials since formation of the solid electrolyte interface (SEI) occurs at the surface, and the formation affects the performance characteristics. The surface area of NP-Sn is thus optimized in that the charge transfer rate is increased by increasing the flux of Li-ions at the surface without the risk of extreme amounts of SEI being formed due to very large surface areas. The average pore size calculated from the Barret-Joyner-Halenda (BJH) model using the adsorption isotherm is 70 nm with a total pore volume of 0.045 cm$^3$g$^{-1}$ (see FIG. 16b). As shown in further tests detailed below, this open porous system combined with the nanoparticle ligament morphology are incredibly good at accommodating the cycling induced volume expansion (300-400%) taking place when the NP-Sn powder is electrochemically alloyed with Li.

Figure 9:
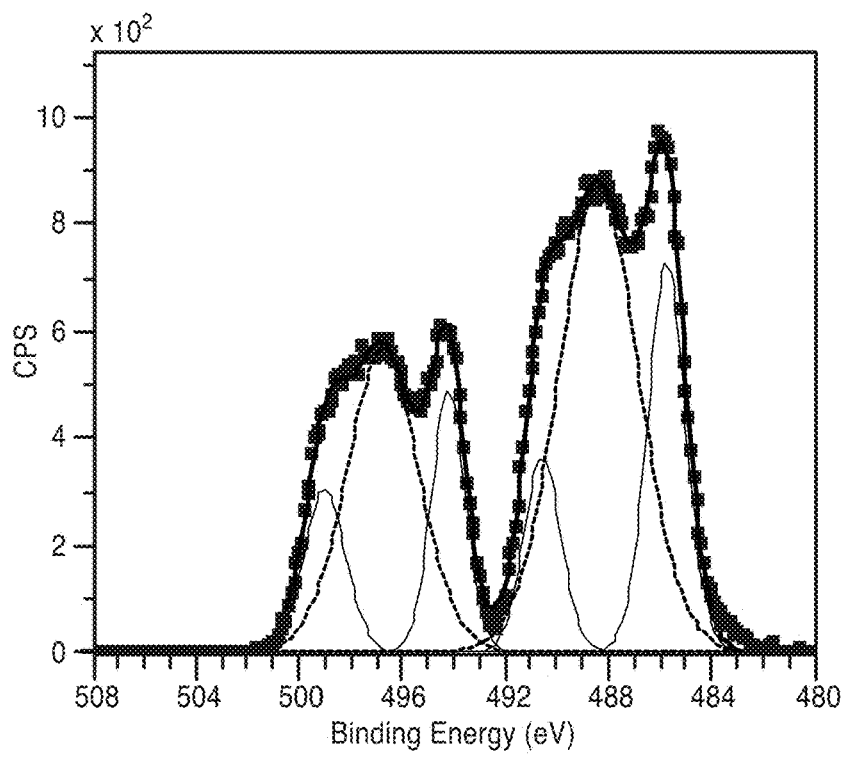
FIG. 9 is a plot of high resolution Sn 3d X-ray photoelectron spectroscopy spectrum.

X-ray photoelectron spectroscopy (XPS) was carried out to characterize the surface of the NP-Sn. One survey scan indicated the presence of Sn, oxygen, carbon, and magnesium, which was also found with EDS. FIG. 9 shows the high resolution XPS spectrum of the Sn $3d_{3/2}$ and $3d_{5/2}$ signals which are fitted and assigned to three different chemical states. The binding energy of the $3d_{5/2}$ peak at 485.4 eV and 488.0 eV agrees well with metallic Sn, and SnO$_2$, respectively. The peak at 490.2 eV and its pair at 498.7 can be assigned to SnO$_3^{-2}$ or H$_2$SnO$_3$ type species, respectively. Given the low penetration depth of XPS, the presence of both metallic Sn and tin oxide in the XPS spectra indicates that the surface of the material is covered with only a thin tin oxide layer, which is likely reduced to $Li_2O$ and Sn during the first electrochemical cycle.

The electrochemical properties of the fabricated NP-Sn were evaluated with composite electrodes comprising NP-Sn active material, vapor grown carbon fibers (VGCF), and carboxymethyl cellulose (CMC) binder, as detailed in FIG. 6A and FIG. 6B. VGCF form continuous conductive pathways more easily than carbon black nanoparticles, leading to longer cycle lifetimes. Another advantage of this composite is that, since CMC is utilized as the binder, water can be used as a solvent to process this electrode, thereby eliminating n-methyl pyrolidone, which is an expensive and toxic solvent used in the majority of Li-ion composite electrodes. Additional binders, such as polyacrylic acid, styrene-butadiene rubber or, polyvinylidene fluoride binder and combinations thereof can be used in lieu of the aforementioned CMC binder. Each of these binders has unique properties that are transferred to the composite electrodes. For example, electrodes made PAA binder may show higher charging and discharging rates. FIG. 6A and FIG. 6B show images of a SEM cross section of a ~14 μm thick composite electrode illustrating the interwoven network of carbon fibers that allow for hierarchical support of the NP-Sn upon volume expansion.

The electrochemistry of NP-Sn half cells were investigated by galvanostatic measurements. One activation cycle (insertion and de-insertion at 1000 mAh·g$^{-1}$) was performed at high current density to limit the amount of catalytic high voltage irreversible capacity. The benefit of this activation is twofold: one, the surface of Sn is reduced and converted to a $Li_xSn_y$ alloy, which is less catalytically active toward electrolyte decomposition, which most likely leads to a thinner solid electrode interface (SEI). Secondly, AC electrochemical impedance spectroscopy was used to show that the charge transfer resistance is decreased significantly after the first cycle, and continues to decrease during the first 5 cycles. This decrease in charge transfer can be attributed the conversion of the poorly conducting SnO surface layer to a more conductive interface.

Figure 10:
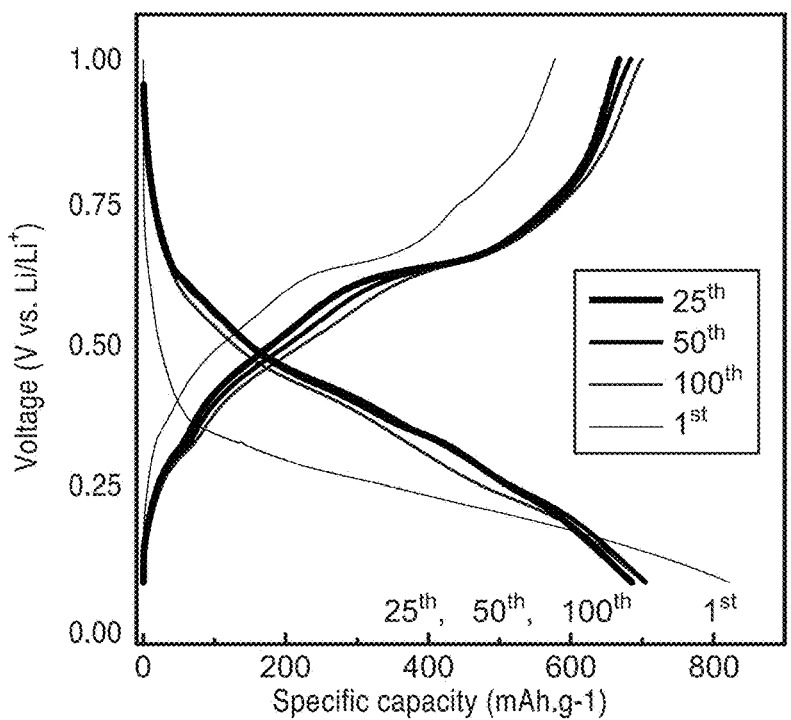
FIG. 10 is a plot of voltage as a function of capacity curves of NP-Sn at 250 mA·g−1.
Figure 11:
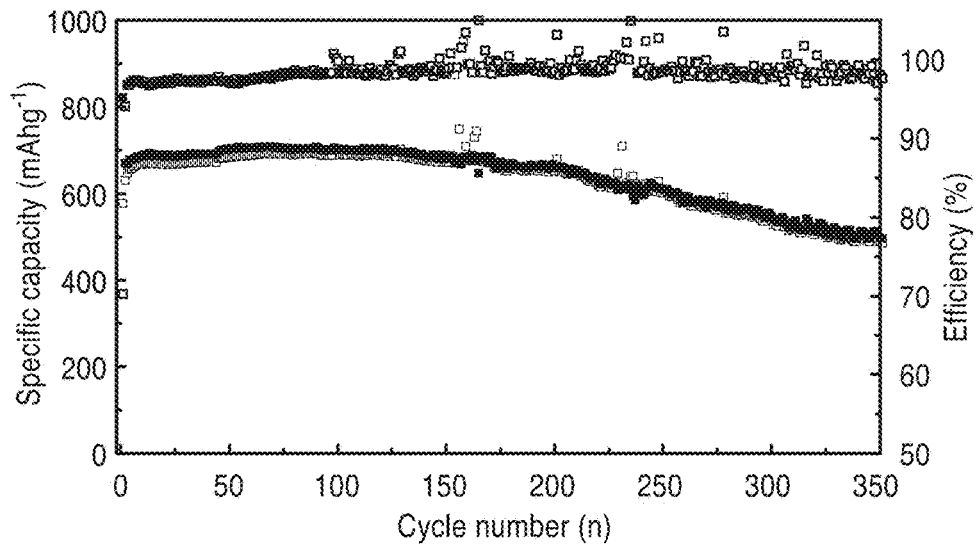
FIG. 11 is a plot showing capacity and coulombic efficiency recorded at 250 mA·g−1 as a function of the cycle number showing the cycle lifetime (charge in black, discharge in grey).

Capacity vs. voltage curves in FIG. 10 show several plateaus that are indicative of two phase reactions of distinct $Li_xSn_y$ phases. After the formation cycle, the first cycle coulombic efficiency of the NP-Sn based material is 70% which is similar to other Sn based electrodes reported in the literature. The coulombic efficiency quickly increases to 97% by the third cycle, which suggests that the SEI layer formed during these first few cycles is stable, and that parasitic side reactions have largely been passivated. It will be shown in the following section that the porous architecture enables this NP-Sn material to expand without cracking, which is a typical failure mechanism of the SEI layer leading to uncontrolled growth of the SEI layer and ultimately cell failure. A capacity increase during the first 5 cycles of 12% from 578 mAh·g$^{-1}$ to 658 mAh·g$^{-1}$ is observed, and is correlated to the decrease in charge transfer resistance measured by impedance spectroscopy over the same interval. Furthermore, it is speculated that the increase in capacity could be due to delayed electrolyte infiltration into the tin mesopores over several cycles. FIG. 10 and FIG. 11 show the extended cycling performance of NP-Sn at 250 mAg$^{-1}$. The capacity starts to slowly decay only after 150 cycles, and at the 277th cycle 80% of the original capacity remains. Finally after 350 charge/discharge cycles, 72% of the capacity remains, which to our knowledge is the best capacity retention reported for micrometer sized tin.

As discussed above, it is believed that the microscopic morphology of the electrode at the nano/meso scale plays a key role in the electrochemical cycling, and affects the battery lifetime significantly. For direct three-dimensional (3D) visualization of the battery electrode, transmission X-ray microscopy was performed on the electrodes recovered from a series of battery cells at different cycling stages.

Figure 12:
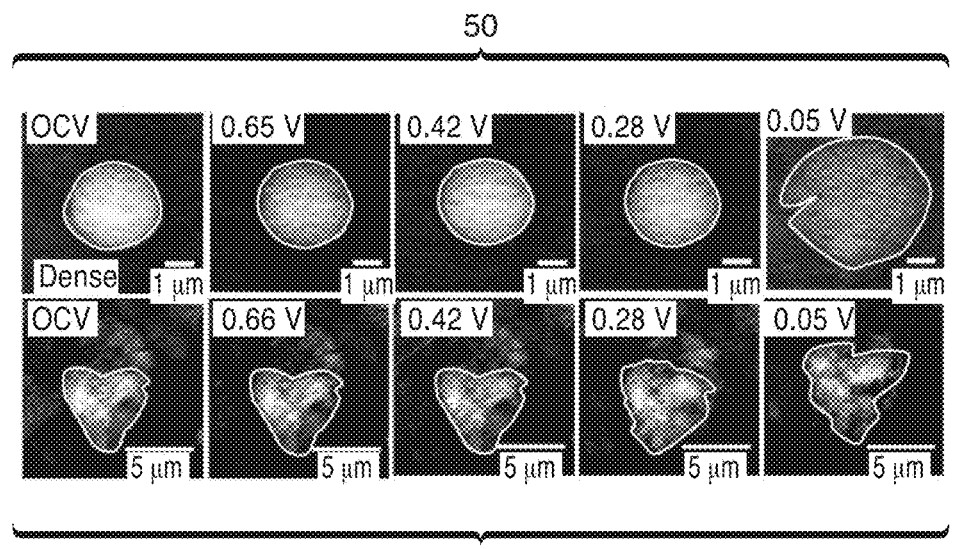
FIG. 12 and FIG. 13 show series absorption images for insertion and de-insertion, respectively, of dense and nanoporous tin collected using an X-ray transparent pouch cell using a Transmission X-ray microscope operating at 8.95 KeV.
Figure 13:
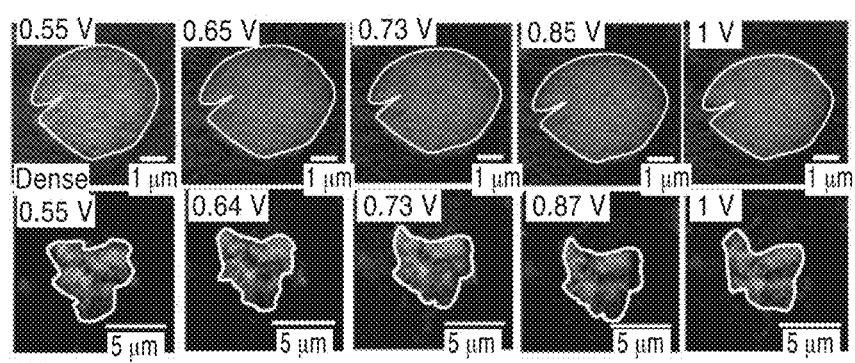

The images shown in FIG. 12 and FIG. 13 were collected from samples in X-ray transparent pouch cells using transmission X-ray microscopy (TXM) during continious galvanostatic cycling. Two different 38 μm×38 μm regions were imaged (~10-20 second delay between regions) with a six minute delay between images in the same region. Working directly below the Cu K-shell absorption edge (8.98 keV) afforded excellent X-ray transmission through the 9 μm thick copper current collector and provided excellent contrast between tin and other battery components. The dense tin particle in sequence of images 50 Of FIG. 12 clearly shows expansion and crack propagation as the Li-concentration increases, which has been reported previously using TXM. The percent areal expansion is defined in Eq. 2:

$$\% \ Areal_{expansion}(E) = \left(\frac{area_E}{area_{OCV}} - 1\right) \cdot 100 \qquad \text{Eq. 2}$$

where the areal expansion is a function of the voltage E, and area$_E$ is the area of the tin particle at voltage E, and area$_{OCV}$ is the area of the pristine particle at the open circuit voltage (before lithiation).

Figure 14:
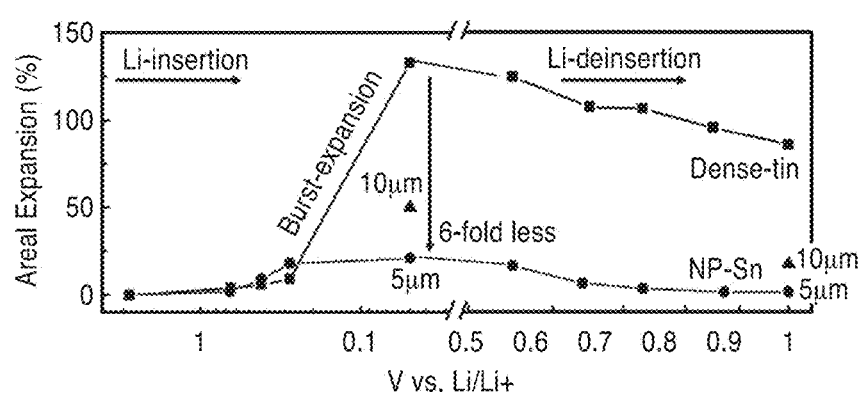
FIG. 14 shows a plot of percent areal expansion for dense tin, 5 µm NP-Sn, and 10 µm NP-Sn at different voltages and lithiation states.

The areal expansion of this dense tin grain was quantified from these images, using Image J, and is plotted as a function of voltage (shown in FIG. 14 as dark squares). The areal expansion of this particle increases to 9% at 0.28 V followed by a large expansion to 134% of its original size by 0.05 V (i.e. a burst-expansion mechanism occurs predominantly at the end of the insertion process). Assuming spherical symmetry and homogenous expansion, geometrically the volume expansion can be estimated from the areal expansion through the geometric relationship in Eq. 3:

$$\% \ Volume_{expansion} = \left(\sqrt[\frac{3}{2}]{\frac{area_E}{area_{OCV}}} - 1\right) \cdot 100 \qquad \text{Eq. 3}$$

Using Eq. 3, the calculated volume expansion is 260% of its original size, in agreement with previous reports on tin based materials. Another consideration that affects the reversibility in dense tin is that the volume change mostly occurs at the end of the insertion process, which is also consistent with previous reports. This accelerated expansion is one factor responsible for crack formation, seen in our TXM images, which expose new surfaces to the electrolyte that can undergo reaction with the electrolyte. FIG. 14 shows that the particle does not contract back to its original size or shape (irreversible deformation), most likely because there are non-accessible Li-rich domains within the particle that are either electrically insulated or physically separated from the slurry matrix. Cracks formed during lithiation remain in the material.

The dramatic expansion observed for dense tin is significantly reduced in NP-Sn, as can be seen in series of images 52 in FIG. 12. The areal expansion of this ~5 μm NP-Sn grain was quantified from these images, and plotted as a function of voltage (shown in FIG. 14 as light circles). The areal expansion, defined similarly as above, is only 21% compared to the 134% expansion for dense tin—a six-fold decrease. In addition, the NP-Sn evolves to the final lithiated state more homogeneously. This areal expansion is estimated to correspond to a volume expansion increase of only 33% of the original size using Eq. 2. While this geometric relationship is strictly only valid for spherical symmetry, this analysis does at least provide a reasonable estimation of the volume expansion. As a result of the decreased expansion, no cracks formed during the lithiation or delithiation process.

The areal expansion of another larger particle was also plotted (shown in FIG. 14 as red triangles) with a diameter of ~10 μm, at the lithiated and delithiated state only. This larger particle appears to expands somewhat more than the smaller particle (50% areal expansion and 84% volume expansion in the lithiated state), but still contracts back nearly to its original size in the delithiated state (remains just 17% expanded). A full expansion set was not collected on this particle because the edges were in poor focus, making it hard to determine the area. While the expansion apparently depends somewhat on the size of the NP-Sn particles, the areal expansion in this larger tin particle is still nearly three-fold less than the dense tin and much more reversible. The dominating mechanism for both the reduced expansion and the increase reversibility in these porous particles probably derives from the open porous network that is both flexible, and accommodates the expanding ligaments.

As a result of the internal porosity of NP-Sn being about ~25%, electrolyte penetrates into the particle and deinsertion is also much more reversible in NP-Sn compared to dense tin. NP-Sn recovers 728 mAh/g capacity while dense tin only recovers 588 mAh/g. This disparity in utilization can be directly seen in the series of TXM images 54 corresponding to the deinsertion process in FIG. 13. In contrast to dense tin, which only contracts slightly, the NP-Sn grain contracts back nearly to the same total area as the pristine NP-Sn grain, as shown in the series of images 54 shown in FIG. 13. These direct structural observations lead to the understanding that the nanoscale porosity and mechanical flexibility is responsible for the overall reduced expansion and better reversibility, which in turn leads to better utilization of the active material. The long-lifetime observed for NP-Sn is most likely strongly influenced by both of these factors observed here.

Another structural feature of the NP-Sn particle shown in FIG. 13 and quantified in FIG. 14, is that it begins to expand sooner (at higher voltage) compared to dense tin, which indicates that the nanoscale architecture influences the lithiation kinetics. The time-scale of the lithiation process in a diffusion controlled system, such as the lithiation of tin, is proportional to the diffusion length squared. Therefore, decreasing the diffusion length by one order of magnitude (e.g. 1 μm to 100 nm), should have an amplified effect of reducing the lithiation time-scales in the nanoporous material by two-orders of magnitude. As a result, the faster kinetics in NP-Sn most likely leads to a more homogeneous lithiation process compared to dense tin, which may lead to the enhanced cycle lifetimes.

In order to further understand the role of porosity in enabling long-term cycle life, a population of individual pores was monitored in a single NP-Sn grain during cycling. While pores are observed in the particle shown in FIG. 12 through FIG. 14, those pores are hard to discern and quantify due to the small particle size. To monitor changes in the pores better, the larger 10 μm NP-Sn grain also chosen for analysis, as shown in FIG. 12 through FIG. 14. The center of this NP-Sn grain was in excellent focus throughout cycling and underwent an expansion similar to the smaller ~5 μm NP-Sn particle.

A final feature of the images is that the pores of the NP-Sn material appear to remain interconnected throughout the Li alloying and dealloying process. Having an interconnected pore and ligament architecture during charge and discharge is highly beneficial for good performance.

Previous transmission X-ray microscopy studies on bulk Sn have suggested that the major failure mechanisms in tin based electrodes is significant cracking during charge and discharge exposing fresh tin surfaces that can participate in further electrolyte decomposition which increases the cell impedance and decreases the lifetime. In addition, the carbon electrode matrix permanently deforms during the expansion process, leading to Sn that is electronically isolated from the conductive matrix. Combining the observation that porosity is retained at both states of charge (0% and 100%) in TXM and the long-term cycling stability seems to indicate that extreme volume change is reduced significantly. This observation is in good agreement with the anticipated picture that the porous morphology at nano/meso scale provides positive impact on the battery cycling lifetime.

It is appreciated that the NP-Sn material herein does not achieve the theoretical capacity of Sn. The $Li_{22}Sn_5$ phase of Sn corresponds to a capacity of 990 $mAh \cdot g^{-1}$. However, the maximum capacity achieved for NP-Sn is 693 $mAh \cdot g^{-1}$. In the above detailed embodiment ~10% of the capacity (~70 $mAh \cdot g^{-1}$) is sacrificed by limiting the lower voltage cut-off to 70 mV. Previous studies have shown that under potential Li deposition occurs on graphite surfaces, especially at fast rates, which can negatively affect the cycle lifetime. However, even with the higher 70 mV cut off voltage the $Li_{22}Sn_5$ phase is still formed. The $Li_{22}Sn_5$ phase (2.05 $gcm^{-3}$) is markedly lower in density than β-tin phase (7.30 $gcm^{-3}$) and complete conversion to this phase represents the largest final volume change during the electrochemical lithiation. This data suggests that the improved electrochemical performance is achieved through the material properties itself, and not artificially through controlling the lower voltage cut off. Furthermore, ~5% magnesium remains as confirmed by XRD and EDAX (FIG. 7B), which further lowers the accessible capacity by at least ~50 $mAh \cdot g^{-1}$. The capacity of 693 $mAh \cdot g^{-1}$ achieved in this work represents nearly the double of the specific capacity of graphite used in commercial applications.

In practical Li-ion batteries, anode capacities above 1000 $mAh \cdot g^{-1}$ add very little to the total energy density of the full battery due to capacity matching considerations. So, doubling or tripling the gravimetric capacity of an anode material may not lead to the same magnification in total cell capacity. Volumetric energy density, on the other hand, is an extremely important metric because of the size limitations in most end-use applications. In comparison to graphite, tin has a nearly three-fold higher theoretical volumetric capacity compared to graphite. The calculated volumetric capacity of the material investigated herein is 1400 $mAhcm^{-3}$ which is double that of graphite (based on the density of the $Li_{22}Sn_5$ phase 2.05 $gcm^{-3}$). This increased volumetric capacity has a significant effect on the reduction in overall size of a full cell battery.

Figure 15A:
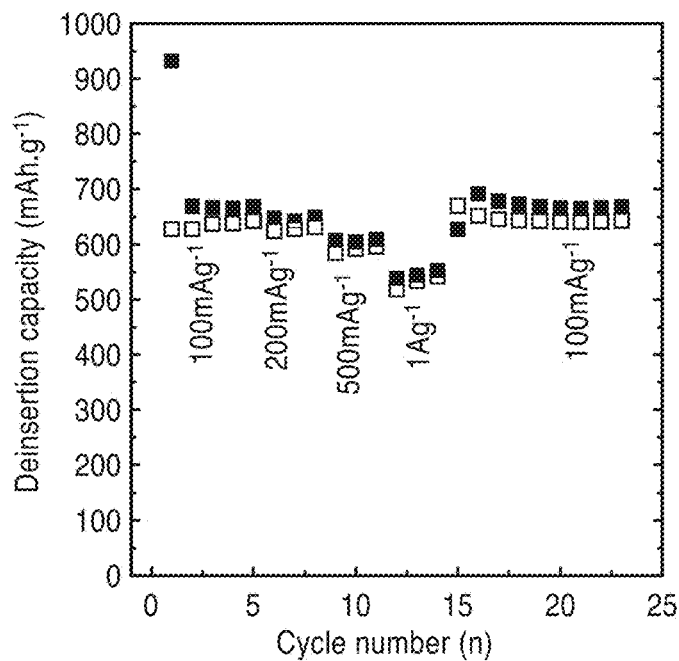
FIG. 15A is a plot of the capacity of NP-Sn as a function of cycle number at different current densities (charge in black, discharge in grey).
Figure 15B:
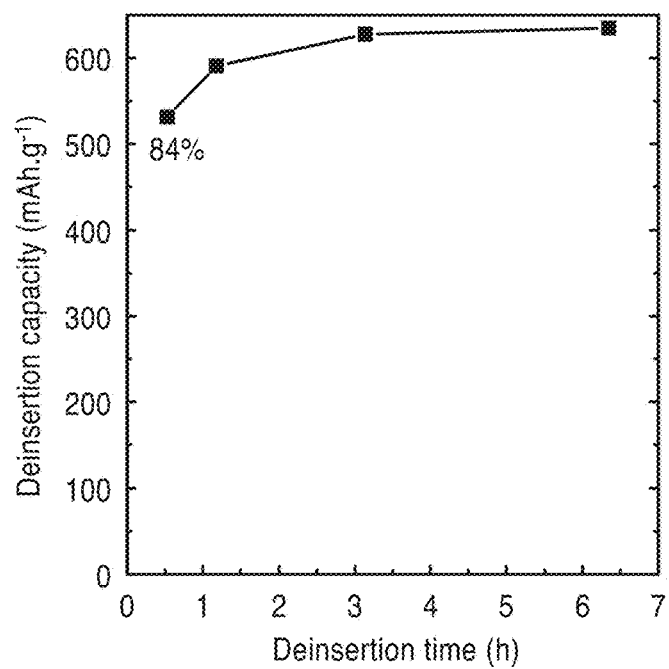
FIG. 15B is a plot of the discharge capacity of NP-Sn as a function of the deinsertion time.

The kinetic performance of NP-Sn was investigated through galvanostatic charge and discharge from 100 $mA \cdot g^{-1}$ to 1000 $mA \cdot g^{-1}$. FIG. 15A and FIG. 15B show that the charge storage capacity NP-Sn is nearly independent of rate between 100-500 $mA \cdot g^{-1}$ retaining over 93% of the original capacity at 500 $mAhg^{-1}$. Even at 1 $A \cdot g^{-1}$, over 84% of the capacity, or 531 mAh·g$^{-1}$, can be accessed, which is 3-fold higher than graphite at the same current density. Most battery electrode materials that store charge through solid state diffusion mechanisms have a charge storage relationship that scales with the square root of time. However, this relationship is not observed for NP-Sn between 100-500 mA·g$^{-1}$. It is surmised that the fast kinetics arise from the synergistic effect of the hierarchical electrode structure of the NP-Sn fabricated in accordance with the present description, in particular because the porous Sn powder comprises of interconnected nanograins that are electrically well connected to the macroporous carbon fiber electrode network. The interplay between the ideal porosity at multiple levels and a highly electrically conducting network enable this NP-Sn system to undergo extremely fast charge transfer.

6. Alternative Configurations

While the description above is primarily directed to Li-ion battery configuration, it is appreciated that the fabricated NP-Sn of the present description may also be implemented for other insertion modalities, e.g. Na-ion and Mg-ion batteries.

FIG. 17A and FIG. 17B show corresponding capacities and coulomb efficiency as a function of the number of cycles at different current densities for sodiation (solid dots) and desodiation (circles) of nanowire-shaped NP-Sn (FIG. 17A) and the granular-shaped NP-Sn (FIG. 17B) of the present description. 10 cycles were performed at each current density of 40 mA/g, 100 mA/g and 200 mA/g. The coulomb efficiency for the granular-shaped NP-Sn (FIG. 17B) starts out rather low on the first cycle, but then rapidly increases, approaching 100% after 30 cycles for the granular material. The coulomb efficiency is artificially high for the nanowire-shaped NP-Sn (FIG. 17A) at long times because the system has basically lost all capacity. The first cycle irreversibility is generally assigned to solid-electrolyte interphase (SEI) layer formation and to reduction of any tin oxide back to metallic tin. In agreement with these concepts, the granular NP-Sn, which we expect to be more oxidized that the nanowire based sample, show greater first cycle irreversibility.

Rapid capacity fade occurs within the first 10 cycles in the materials with nanowire-type ligaments, as seen in FIG. 17A and FIG. 17B and FIG. 18. As a result, the high rate capacity can not be effectively evaluated in these samples because the overall capacity is dropping precipitously as the scan rate is increasing. By contrast, the granular NP-Sn sample shows good capacity retention to 100 mA/g and reasonable capacity retention at 200 mA/g.

FIG. 18 shows a plot of the long-term stability test for nanowire-shaped NP-Sn (light curve) and granular-shaped NP-Sn (dark curve) for sodiation (solid dots) and desodiation (circles) performed at a current density of 40 mA/g. The nanowire based sample again shows rapid capacity fade in the first 10 cycles. In contrast, a capacity retention of 50% was achieved after 95 cycles in the structure with granular ligaments. While this value may seem low compared to Sn metal cycled with Li based materials, it is quite good for Na. While the performance is impressive, it is worth emphasizing that the free-corrosion dealloying route used in the present work to synthesize NP-Sn is very cost-effective in term of large-scale applications, since dealloying does not involve complex lithography or templating techniques. While the stability is quite impressive, Sn metal is attractive for its high volumetric capacity; as a result the use of such highly porous electrodes defeats one of the prime benefits of using Sn anodes.

While the example above is primarily directed to a SnMg master alloy that is dealloyed via ammonium sulphate, it is appreciated that the systems and methods detailed herein may also be incorporated with alternative sacrificial components (which ultimately create the pores) in the master alloys, and/or alternative ways to remove those sacrificial elements (e.g. dealloying solution).

Bulk nanoporous metals are commonly made by dealloying, a top-down nanosynthesis technique, where the most chemically active element is selectively removed from a dense parent alloy using acidic or alkaline aqueous electrolytes. This method has been demonstrated in the present description for use of nanoporous tin as a high energy dense negative electrode material using a Mg-rich tin alloy, but several other porous metal electrode candidates exist. In order to synthesize additional porous metals, it is desired to first have access/synthesize a larger library of metal alloy precursors. In addition, the nature and/or content of sacrificial element in the alloy ultimately affect the final ligament size, ligament morphology, and pore size. The desired content of sacrificial element in the parent alloy should be high enough to induce spinodal decomposition during dealloying (usually around 55% or higher depending on the system)

Parent alloys such as, Sn—Mn, Sn—Zn, and Sn—Al represent examples that could be used to further synthesis of nanoporous Sn, and other negative electrode materials, ultimately leading to control over the electrochemical performance (rate and stability) in an energy storage device.

Several other materials are highly valuable for negative anodes in Li-ion/Na-ion/Mg-ion batteries, and could be commercially viable if porous forms of those materials were used. Several examples of ternary parent systems that lead to binary materials are applicable as high performance negative electrodes according to the function:

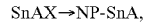

where X=Mg, Mn, Zn, Al, and A=C, Si, Sb, Bi, Ge, Pb, Al, Mg, Co, Ni.

Exemplary configurations of those materials are binary nanoporous SnSi, SiC, SnSb, SnBi, SnGe, SnPb, SnAl, SnMg, SnCo, SnNi.

Another important parameter in ultimately controlling the electrochemical properties of these materials is directly related to how the sacrificial element is removed. For example, if the rate of reaction is too fast, the morphology will be poor, and the resulting stability of the anodes will be poor. Accordingly, the corroding solution is selected so as to have a substantially uniform rate of reaction. The following corroding solutions can be used to synthesize the porous metals that described above: a) ammonium sulfate solutions; b) potassium hydroxide solutions; c) sodium hydroxide solutions; d) hydrochloric acid solutions; e) sulfuric acid solutions; and f) acetic acid solutions.

7. Conclusions

Micrometer sized grains of nanoporous Sn have been synthesized through a simple and scalable selective alloy corrosion method. The ligament morphology in the nanoporous Sn of the present description is comprised of interconnected nanoparticles, rather than the more widely observed nanowire-like morphology. When used as anode material in a Li-half cell, Sn metal with this porous architecture exhibits long cycle lifetimes of over 350 cycles. Such cyclability has not been achieved with either nanostructured or bulk Sn. Synchrotron based ex-situ X-ray tomography was used to examine the origins of the markedly improved cycling lifetimes. This experiment has led to the understanding that the novel nanoporous Sn architecture of the present description is preserved in the lithiated state and helps to accommodate the extreme volume expansion during cycling. Beside the long cycle lifetimes, fast kinetic performance is exhibited by the nanoporous Sn powder. At a current density of 1 A·g$^{-1}$, over 84% of the initial capacity is recovered. The nanoporous metals of the present description are ideal architectures for alloy-type electrochemical energy storage materials. More specifically, nanoporous metals of the present description exhibit a very good intrinsic electrical conductivity and they are able to accommodate the Li storage-induced volume change.

The disclosed nanoporous Sn powder and methods of fabricating thereof are also particularly viable for large scale fabrication of NP-Sn. While the large content of sacrificial Mg (85 at. %) may seem wasteful, the Mg can be recovered by Mg electro winning, an affordable process used to both electrochemically recycle or to extract Mg from its ores. Moreover, a precursor alloy with 85 at. % Mg is only 54 wt. % Mg and the cost of Mg per kg is about ⅒$^{th}$ the cost of Sn. As a result, from a materials point of view, the large content of sacrificial Mg is not economically prohibitive. Moreover, many nanomaterials synthesis methods involve high energy and high cost reagents such as SnCl$_4$. Compared to reagents like this, the added cost required to recover magnesium is small. While there are costs associated with all the processing steps, the method proposed here appear to be much more scalable than many nanomaterials synthesis methods.

From the description herein, it will be appreciated that that the present disclosure encompasses multiple embodiments which include, but are not limited to, the following:

1. An active material for use in an energy storage device, comprising: a population of micrometer sized metal, semi metal or semiconducting particles; wherein the each of the particles comprise a hierarchically porous structure comprising a network of interconnected ligament-shaped structures and pores; said pores being defined by adjacent interconnected ligament-shaped structures; wherein each of said interconnected ligament-shaped structures comprises a granular structure comprising a population of sub-pores; and wherein said hierarchically porous structure is configured to allow for cycling induced volume expansion upon being electrochemically alloyed within the energy storage device.

2. The material of any preceding embodiment, wherein said pores comprise nanopores and wherein said sub-pores comprise mesopores.

3. The material of any preceding embodiment wherein the mesopores comprise pores approximately 5 nm in size.

4. The material of any preceding embodiment, wherein said particles are composed of a metal or semiconductor selected from the group of metals and semiconductors consisting essentially of Ge, Sb, As, Bi, Si, Sn, SnC, SnSb, SnSi, SnGe, SnAs, SnAl, SnBi, SnCo, SnNi, and SnPb.

5. The material of any preceding embodiment, wherein said particles comprise nanoporous tin.

6. The material of any preceding embodiment, wherein said particles have a diameter between approximately 1-100 μm.

7. The material of any preceding embodiment, wherein the material is configured to be coupled to a charge collector as an electrode.

8. The material of any preceding embodiment, wherein the material is configured to allow for cycling induced volume expansion upon being electrochemically alloyed with LI Na or Mg.

9. An electrode for use with an energy storage device, comprising: (a) a macroporous conductor; (b) an active material configured to be disposed within macropores of the macroporous conductor, the active material comprising: a population of micrometer sized metal, semi metal or semiconducting particles; wherein the each of the particles comprise a hierarchically porous structure comprising a network of interconnected ligament-shaped structures and pores; said pores being defined by adjacent interconnected ligament-shaped structures; wherein each of said interconnected ligament-shaped structures comprises a granular structure comprising a population of sub-pores; and (c) a charge collector electrically coupled with the active material; (d) wherein said hierarchically porous structure is configured to allow for cycling induced volume expansion upon being electrochemically alloyed within the energy storage device.

10. The electrode of any preceding embodiment, wherein said pores comprise nanopores and wherein said sub-pores comprise mesopores.

11. The electrode of any preceding embodiment, wherein the mesopores comprise pores approximately 5 nm in size.

12. The electrode of any preceding embodiment, wherein said particles are composed of a metal or semiconductor selected from the group of metals and semiconductors consisting essentially of Ge, Sb, As, Bi, Si, Sn, SnC, SnSb, SnSi, SnGe, SnAs, SnAl, SnBi, SnCo, SnNi, and SnPb.

13. The electrode of any preceding embodiment, wherein said particles comprise nanoporous tin.

14. The electrode of any preceding embodiment, wherein said particles have a diameter between approximately 1-100 μm.

15. The electrode of any preceding embodiment, wherein the material is configured to allow for cycling induced volume expansion upon being electrochemically alloyed with LI Na or Mg.

16. The electrode of any preceding embodiment, wherein said macroporous conductor comprises an additive selected from the group of additives consisting essentially of: vapor grown carbon fibers (VGCF), graphite, carbon nanotubes, fullerenes, graphene flakes, carbon black, and conductive polymer nanoparticles.

17. The electrode of any preceding embodiment, further comprising a binder; wherein said binder comprises a carboxymethyl cellulose (CMC) or, polyacrylic acid or, styrene-butadiene rubber or, polyvinylidene fluoride binder and combinations thereof.

18. A method of fabricating an active material for use in an energy storage device: a) providing an alloy of Ge, Si, Sb, As, Bi or Sn with a sacrificial metal in a ratio of approximately 55 to 99 sacrificial metal atoms to every 100 atoms of alloy; and b) sacrificing said sacrificial metal atoms of the alloy to produce porous particles of a metal (Ge, Si, Sb, As, Bi, Sn, SnC, SnSb, SnSi, SnGe, SnAs, SnAl, SnBi, SnCo, SnNi, and SnPb); c) sacrificing the sacrificial metal atoms is performs such that the particles of metal are pulverized into a population of micrometer sized particles; d) wherein the each of the particles comprise a hierarchically porous structure comprising a network of interconnected ligament-shaped structures and pores.

19. The method of any preceding embodiment: said pores being defined by adjacent interconnected ligament-shaped structures; wherein each of said interconnected ligament-shaped structures comprises a granular structure comprising a population of sub-pores.

20. The method of any preceding embodiment, wherein said hierarchically porous structure is configured to allow for cycling induced volume expansion upon being electrochemically alloyed within the energy storage device.

21. The method of any preceding embodiment, wherein said alloy is selected from the group of alloys consisting essentially of AX, where A=Ge, Si, Sb, As, Bi or Sn, and X=Mg, Mn, Zn, or Al and wherein said alloys generate Ge, Si, Sb, As, Bi, and Sn.

22. The method of any preceding embodiment, wherein said alloy is selected from the group of alloys consisting essentially of SnCX, SnSbX, SnSiX, SnGeX, SnAsX, SnAlX, SnBiX, SnCoX, SnNiX, and SnPbX where X=Mg or Al or Mn or Zn, and wherein said alloys generate SnC, SnSb, SnSi, SnGe, SnAs, SnAl, SnBi, SnCo, SnNi, and SnPb.

23. The method of any preceding embodiment, wherein said alloy comprises SnMg.

24. The method of any preceding embodiment, wherein sacrificing the sacrificial metal atoms comprises dealloying the SnMg to substantially remove Mg from the alloy to generate a nanoporous tin powder.

25. The method of any preceding embodiment: wherein sacrificing the sacrificial metal atoms comprises dealloying the alloy with a corroding solution; wherein the corroding solution is selected so as to have a substantially uniform rate of reaction with the alloy.

26. The method of any preceding embodiment, the corroding solution comprising one or more of: ammonium sulfate, potassium hydroxide, sodium hydroxide, hydrochloric acid, sulfuric acid, or acetic acid.

27. The method of any preceding embodiment, wherein the SnMg is dealloyed with ammonium sulfate.

28. The method of any preceding embodiment, wherein the SnMg is dealloyed according to the equation: $Mg(s)+2NH_4^+(aq) \rightarrow Mg^{2+}+H_2(g)+2NH_3(g)$.

29. An electrode for use with an energy storage device, comprising: (a) an active material of porous micrometer metal, semi metal, or semiconducting particles with ligaments (solid walls) that can be continuous or comprised of nanoparticles; and (b) a charge collector electrically coupled with the active material; (c) wherein large volume expansion associated with energy storage is accommodated by said particle morphology.

30. The electrode of any preceding embodiment, wherein said metal porous particles are composed of a metal or semiconductor selected from the group of metals and semiconductors consisting essentially of Ge, Sb, As, Bi, Si, Sn, SnC, SnSb, SnSi, SnGe, SnAs, SnAl, SnBi, SnCo, SnNi, and SnPb.

31. The electrode of any preceding embodiment, said active material further comprising: (a) a conductive additive; and (b) a binder.

32. The electrode of any preceding embodiment, wherein said conductive additive is an additive selected from the group of additives consisting essentially of vapor grown carbon fibers (VGCF), graphite, carbon nanotubes, fullerenes, graphene flakes, carbon black, and conductive polymer nanoparticles.

33. The electrode of any preceding embodiment, wherein said binder comprises a carboxymethyl cellulose (CMC) or, polyacrylic acid or, styrene-butadiene rubber or, polyvinylidene fluoride binder and combinations thereof.

34. The electrode of any preceding embodiment, wherein said porous micrometer particles have a diameter between approximately 1-100 μm.

35. An electrode for use with an energy storage device, comprising: (a) an active material of porous micrometer particles of tin (NP-Sn) with particle ligaments exhibiting a nanoparticle or dense ligament morphology, vapor grown carbon fibers and a carboxymethyl cellulose binder; and (b) a charge collector electrically coupled with the active material; (c) wherein large volume expansion associated with energy storage is accommodated by said particle morphology.

36. A method of producing an active material of porous particles of a metal or semiconductor exhibiting a nanoparticle ligaments or dense ligaments, comprising: (a) providing an alloy of Ge, Si, Sb, As, Bi or Sn with a sacrificial metal in a ratio of approximately 55 to 99 sacrificial metal atoms to every 100 atoms of alloy; and (b) sacrificing said sacrificial metal atoms of the alloy to produce porous particles of a metal (Ge, Si, Sb, As, Bi, Sn, SnC, SnSb, SnSi, SnGe, SnAs, SnAl, SnBi, SnCo, SnNi, and SnPb) exhibiting nanoparticle ligaments or dense ligament ligaments.

37. The method of any preceding embodiment, wherein said alloy is selected from the group of alloys consisting essentially of AX, where A=Ge, Si, Sb, As, Bi or Sn, and X=Mg, Mn, Zn, or Al and wherein said alloys generate Ge, Si, Sb, As, Bi, and Sn.

38. The method of any preceding embodiment, wherein said alloy is selected from the group of alloys consisting essentially of SnCX, SnSbX, SnSiX, SnGeX, SnAsX, SnAlX, SnBiX, SnCoX, SnNiX, and SnPbX where X=Mg or Al or Mn or Zn, and wherein said alloys generate SnC, SnSb, SnSi, SnGe, SnAs, SnAl, SnBi, SnCo, SnNi, and SnPb.

39. The method of any preceding embodiment, wherein said alloy comprises $Sn_{15}Mg_{85}$ at. %.

40. The method of any preceding embodiment, wherein said particles have a diameter between approximately 1 μm and approximately 100 μm.

41. An electrode for use with an energy storage device, comprising: (a) an active material of porous nanoparticles of a metal with particle ligaments exhibiting a nanoparticle morphology; and (b) a charge collector electrically coupled with the active material; (c) wherein large volume expansion associated with energy storage is accommodated by the particle morphology.

42. The electrode of any previous embodiment, wherein the metal nanoparticles are composed of a metal selected from the group of metals consisting essentially of Ge, Sb, As, Bi and Sn.

43. The electrode of any previous embodiment, the active material further comprising: (a) a conductive additive; and (b) a binder.

44. The electrode of any previous embodiment, wherein the conductive additive is an additive selected from the group of additives consisting essentially of vapor grown carbon fibers (VGCF), graphite, carbon nanotubes, fullerenes, graphene flakes, carbon black, and conductive polymer nanoparticles.

45. The electrode of any previous embodiment, wherein the binder comprises a carboxymethyl cellulose (CMC) binder.

46. The electrode of any previous embodiment, wherein the nanoparticles have a diameter between approximately 1-100 μm.

47. An electrode for use with an energy storage device, comprising: (a) an active material of porous nanoparticles of tin (NP-Sn) with particle ligaments exhibiting a nanoparticle morphology, vapor grown carbon fibers and a carboxynethyl cellulose binder; and (b) a charge collector electrically coupled with the active material; (c) wherein large volume expansion associated with energy storage is accommodated by the particle morphology.

48. A method of producing an active material of porous nanoparticles of a metal exhibiting a nanoparticle morphology, comprising: (a) providing an alloy of Ge, Sb, As, Bi or Sn with a sacrificial metal in a ratio of approximately 15 metal atoms to every 100 atoms of alloy; and (b) sacrificing the sacrificial metal atoms of the alloy to produce porous nanoparticles of a metal exhibiting nanoparticle morphology.

49. The method of any previous embodiment, wherein the alloy is selected from the group of alloys consisting essentially of SnC, SnSb, SnSi, SnAs, SnGe, SnAl, SnBi, SnCo, and SnNi.

50. The method of any previous embodiment, wherein the alloy comprises $Sn_{15}Mg_{85}$ at. %.

51. The method of any previous embodiment, wherein the nanoparticles have a diameter between approximately 1 µm and approximately 100 µm.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An active material for use in an energy storage device, comprising:
   a population of micrometer sized metal, semi metal or semiconducting particles;
   wherein the each of the particles comprise a hierarchically porous structure comprising a network of interconnected ligament-shaped structures and pores;
   said pores being defined by adjacent interconnected ligament-shaped structures;
   wherein each of said interconnected ligament-shaped structures comprises a granular structure comprising a population of sub-pores; and
   wherein said hierarchically porous structure is configured to allow for cycling induced volume expansion upon being electrochemically alloyed within the energy storage device.

2. The material of claim 1, wherein said pores comprise nanopores and wherein said sub-pores comprise mesopores.

3. The material of claim 2, wherein the mesopores comprise pores approximately 5 nm in size.

4. The material of claim 2, wherein said particles are composed of a metal or semiconductor selected from the group of metals and semiconductors consisting essentially of Ge, Sb, As, Bi, Si, Sn, SnC, SnSb, SnSi, SnGe, SnAs, SnAl, SnBi, SnCo, SnNi, and SnPb.

5. The material of claim 2, wherein said particles comprise nanoporous tin.

6. The material of claim 2, wherein said particles have a diameter between approximately 1-100 µm.

7. The material of claim 2, wherein the material is configured to be coupled to a charge collector as an electrode.

8. The material of claim 7, wherein the material is configured to allow for cycling induced volume expansion upon being electrochemically alloyed with LI Na or Mg.

9. An electrode for use with an energy storage device, comprising:
   (a) a macroporous conductor;
   (b) an active material configured to be disposed within macropores of the macroporous conductor, the active material comprising:
      (i) a population of micrometer sized metal, semi metal or semiconducting particles;
      (ii) wherein the each of the particles comprise a hierarchically porous structure comprising a network of interconnected ligament-shaped structures and pores;
      (iii) said pores being defined by adjacent interconnected ligament-shaped structures;
      (iv) wherein each of said interconnected ligament-shaped structures comprises a granular structure comprising a population of sub-pores; and
   (c) a charge collector electrically coupled with the active material;
   (d) wherein said hierarchically porous structure is configured to allow for cycling induced volume expansion upon being electrochemically alloyed within the energy storage device.

10. The electrode of claim 9:
    wherein said pores comprise nanopores; and
    wherein said sub-pores comprise mesopores.

11. The electrode of claim 10, wherein the mesopores comprise pores approximately 5 nm in size.

12. The electrode of claim 10, wherein said particles are composed of a metal or semiconductor selected from the group of metals and semiconductors consisting essentially of Ge, Sb, As, Bi, Si, Sn, SnC, SnSb, SnSi, SnGe, SnAs, SnAl, SnBi, SnCo, SnNi, and SnPb.

13. The electrode of claim 10, wherein said particles comprise nanoporous tin.

14. The electrode of claim 10, wherein said particles have a diameter between approximately 1-100 µm.

15. The electrode of claim 10, wherein the material is configured to allow for cycling induced volume expansion upon being electrochemically alloyed with LI Na or Mg.

16. The electrode of claim 10, wherein said macroporous conductor comprises an additive selected from the group of additives consisting essentially of:
    vapor grown carbon fibers (VGCF), graphite, carbon nanotubes, fullerenes, graphene flakes, carbon black, and conductive polymer nanoparticles.

17. The electrode of claim 10, further comprising:
    a binder;
    wherein said binder comprises a carboxymethyl cellulose (CMC) or, polyacrylic acid or, styrene-butadiene rubber or, polyvinylidene fluoride binder and combinations thereof.

* * * * *